Figure 1:
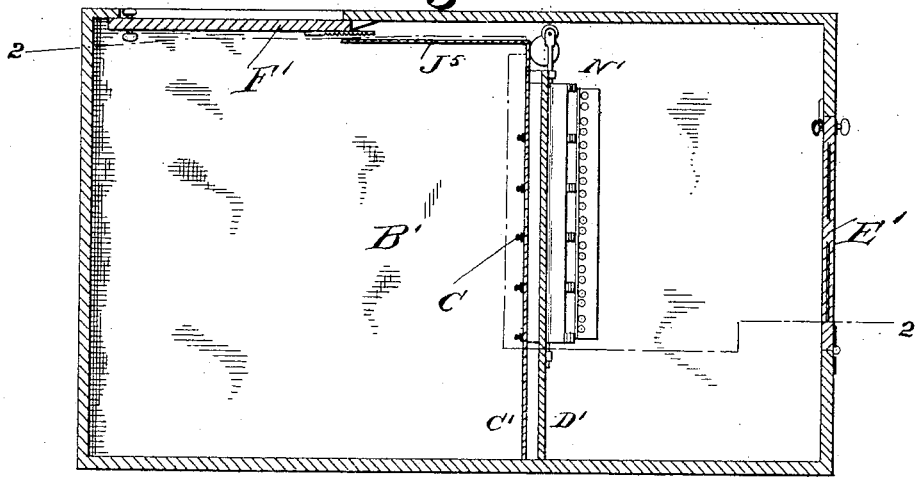

J. H. McELROY.
VOTING MACHINE.
APPLICATION FILED JULY 14, 1899.

944,688.

Patented Dec. 28, 1909.

5 SHEETS—SHEET 1.

Witnesses:
Chas. F. Burnap
R. W. Allen.

Inventor:
John Howard McElroy.

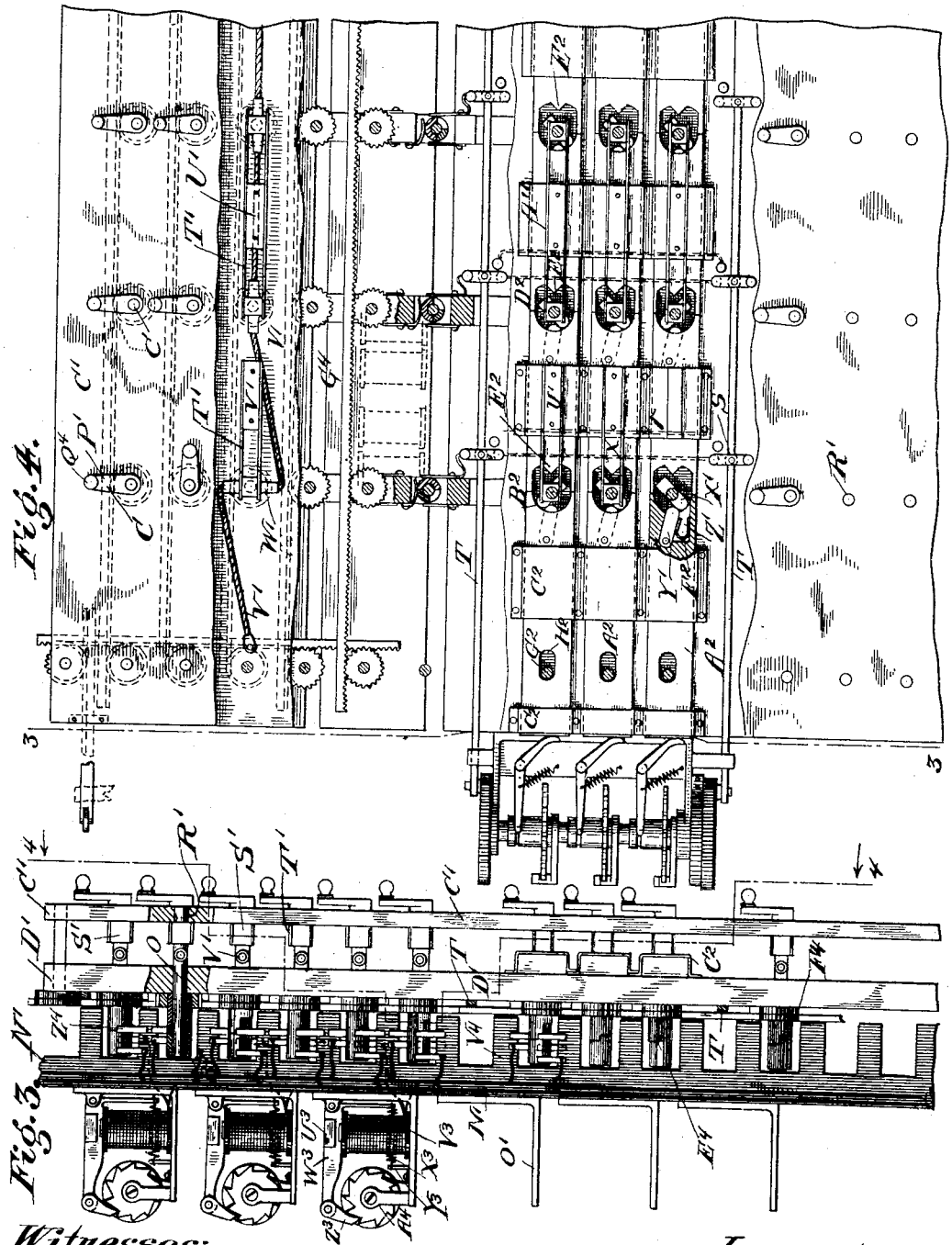

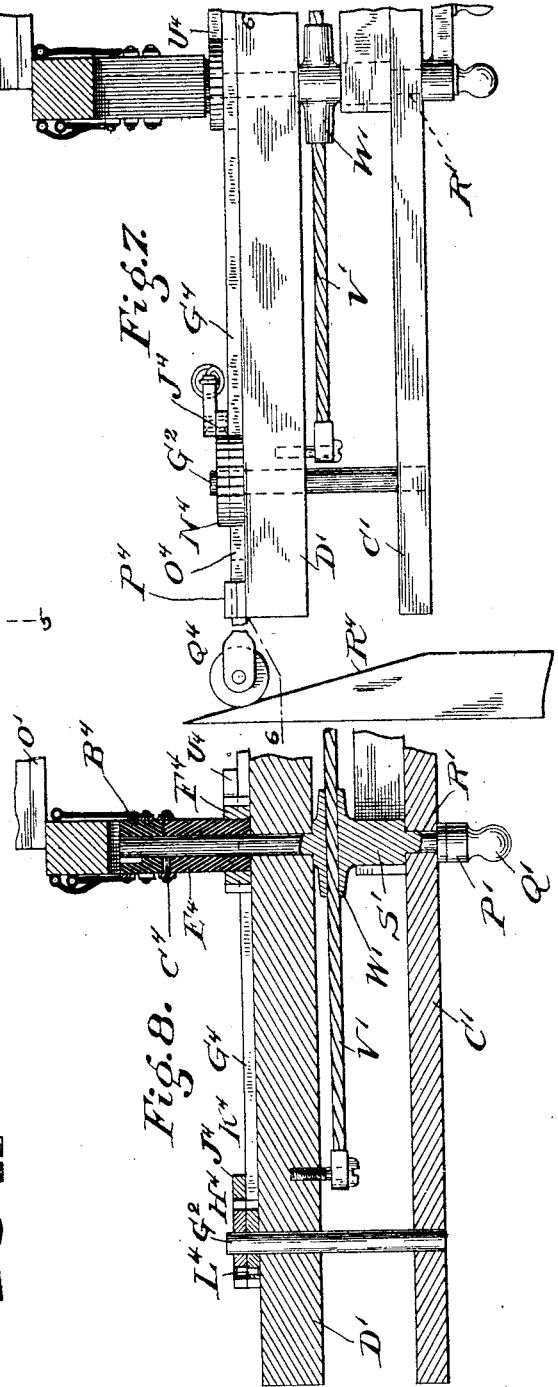

J. H. McELROY.
VOTING MACHINE.
APPLICATION FILED JULY 14, 1899.
944,688.
Patented Dec. 28, 1909.
5 SHEETS—SHEET 4.
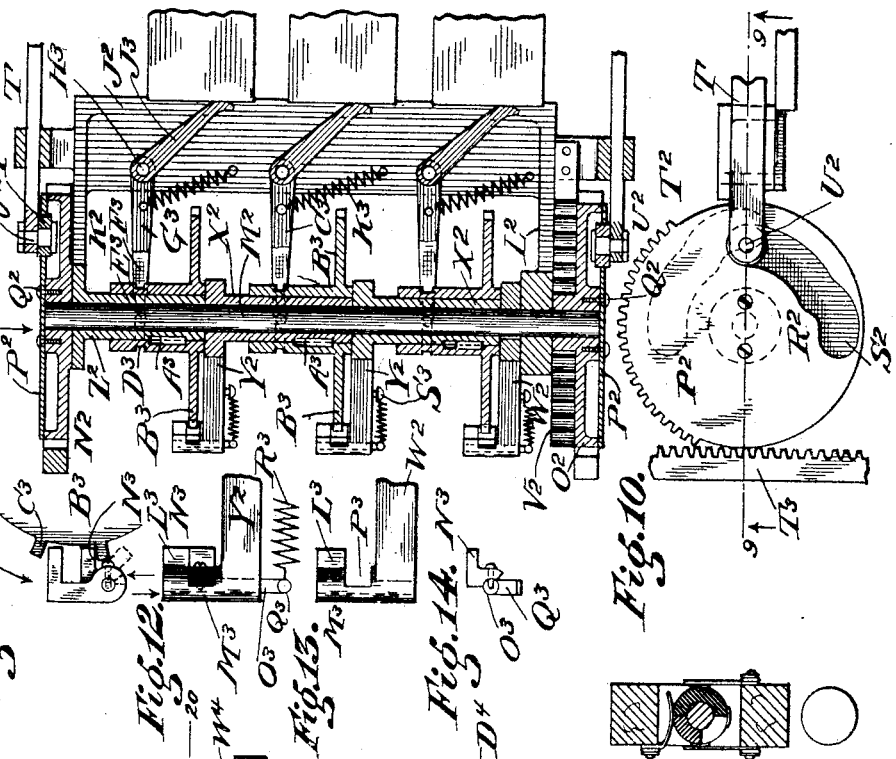
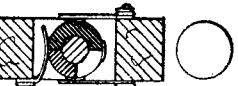
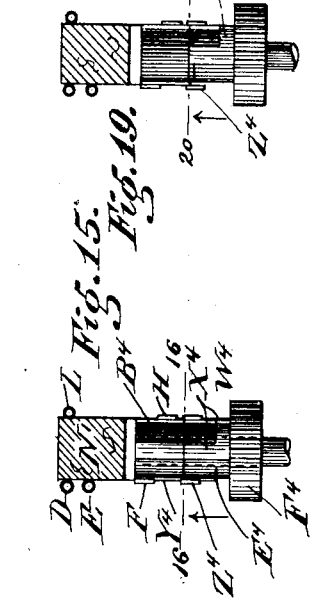
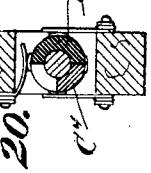
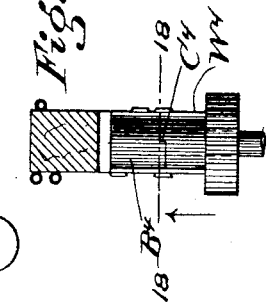
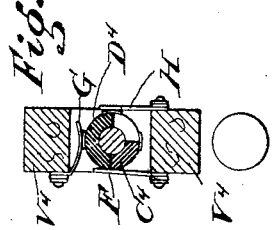
Witnesses:
Inventor:
John Howard McElroy.

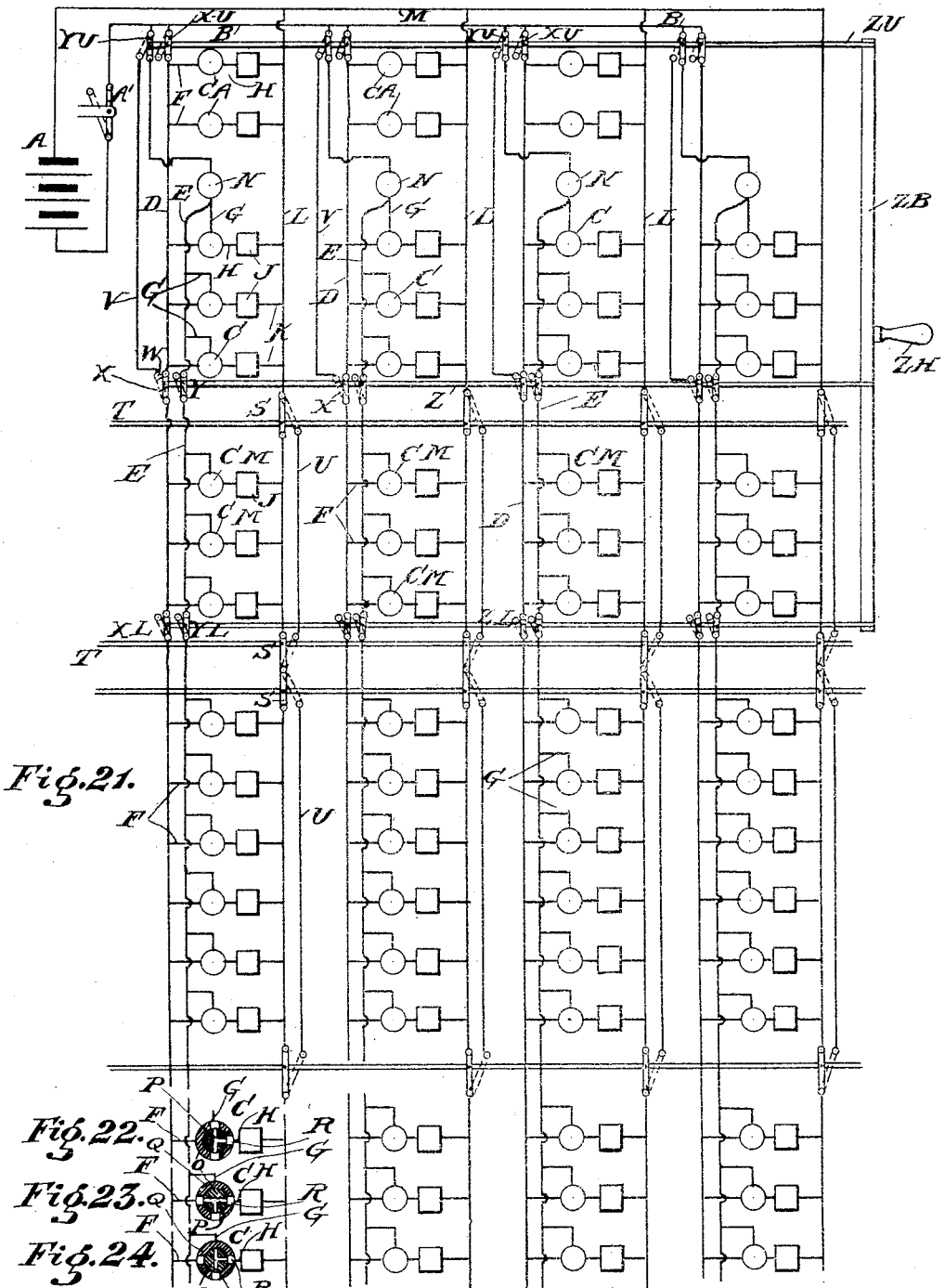

UNITED STATES PATENT OFFICE.

JOHN HOWARD McELROY, OF CHICAGO, ILLINOIS.

VOTING-MACHINE.

944,688.  Specification of Letters Patent.  Patented Dec. 28, 1909.

Application filed July 14, 1899. Serial No. 723,873.

*To all whom it may concern:*

Be it known that I, JOHN HOWARD MC-ELROY, a resident of Chicago, in the county of Cook and State of Illinois, have invented certain new and useful Improvements in Voting-Machines, of which the following is a specification.

My invention relates to certain improvements in voting machines of the general type shown in my application No. 703,068, filed January 23, 1899, and No. 725,213, filed July 27, 1899. In these applications, I have shown a new system for permitting the casting of straight ticket ballots without any delay whatever, and which also permits the casting of a scratched ticket with equal facility. The distinguishing feature of the system employed in these machines is the fact that two sources of operating power are accessible to the registers, and the controlling keys are so arranged that when a straight ticket key has been operated, one source of power will be available to all the unoperated keys in that party row. If, however, any candidate in that party has been scratched by reason of setting the key for some candidate for the same office outside of that party, the connections between the key and the register of the scratched candidate will be so adjusted that the straight ticket power is not available to operate the register for the scratched candidate. The straight ticket keys are interlocked so that but one of them can be operated at a time, but the other source of power is available to all the registers, so that if any key is operated outside of the party for which the straight ticket has been operated, the second source of power will operate that register.

In the application No. 703,068, above referred to, I have shown the power as pneumatic, and the two sources of power are different pneumatic forces. In the application No. 725,213, above referred to, the sources of power are purely mechanical, while in the present application, I have shown a machine constructed as adapted for the use of electricity as the motive power, and similar to the prior machines, the keys are arranged so that straight ticket ballots are operated by the current passing through one set of contacts, while the scratched keys are operated by the current passing through another set of contacts, and the keys are so arranged or interlocked that it is impossible to cast ballots for more candidates than the voter is entitled to vote for.

Figure 2:
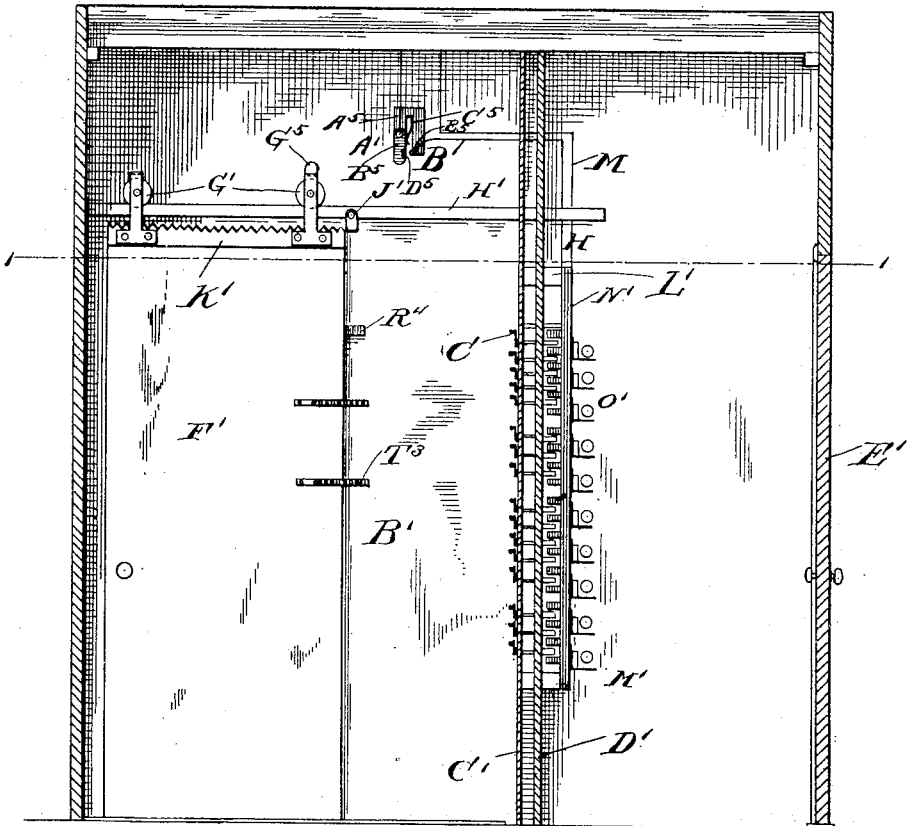

Referring to the drawings, in which the same letters of reference are used to designate identical parts in all the figures, Figure 1 is a plan view of the booth and the voting mechanism in section on the line 1—1 of Fig. 2; Fig. 2 is a side elevation in section on the line 2—2 of Fig. 1; Fig. 3 is a sectional elevation on a larger scale of the voting apparatus on the line 3—3 of Fig. 4; Fig. 4 is a front elevation of one end of the keyboard, some of the parts being broken away on the line 4—4 of Fig. 3, to show the details of the construction; Fig. 5 is a detail in section on the line 5—5 of Fig. 6, and on a still larger scale to show the location of the contacts; Fig. 6 is a detail view on the line 6—6 of Fig. 7; Fig. 7 is a plan view of certain details on the line 7—7 of Fig. 6; Fig. 8 is a similar view, but in section, on the line 8—8 of Fig. 6; Fig. 9 is a sectional view of the multi-candidate controlling device on the line 9—9 of Fig. 10; Fig. 10 is a plan view of the multi-candidate controlling device; Figs. 11 to 14 inclusive are details of the construction of an escapement used on the multi-candidate controlling device; Figs. 15 and 16, 17 and 18, and 19 and 20 are plan views and sections on the lines indicated, of the contact devices of the keys in the three different positions in which they may be placed; Fig. 21 is a diagrammatic view showing the positions and connections of the keys and registers; and Figs. 22 to 24 are diagrammatic views of the contact devices of the keys in the three different positions in which they may be placed, the diagrammatic construction differing from the one actually employed, but serving to illustrate more clearly the method of operation.

Referring first to Fig. 21, in which I have shown a diagrammatic view of the system employed in my present invention, A represents the battery or other source of galvanic current which I employ in the machine. A wire B carries the outgoing current over each of the columns of keys C, and the branch wires D and E extend down alongside of each column. The wires D carry what I call the "scratched" current, and they are connected to the left hand sides of the keys C by branches F. The wires E carry what I call "straight" current and are connected to the tops of the keys C by the branches G. The branch wires H connect the right hand side of the keys C with the electro-magnets which have armatures to operate the registers, and which electromagnets I indicate diagrammatically by the squares J. These are connected by the branches K with the return wires L which in turn run upward along the columns of keys C, and are connected to the return trunk wire M, which, of course, is connected to the opposite pole of the battery A. Instead of being in constant connection with the current, as are the scratched current wires D, the straight current wires E have the cut out keys N, between the trunk wire B and the first keys C to which they are connected. In their normal or unoperated position, the cut out keys N or "straight ticket" keys, as I shall in the future call them, break the circuit, and the portions of the wires E beneath them are dead. These straight ticket keys N are interlocked by means to be subsequently described, so that but one of them can be moved to its operative position at a time, and when any one is thus moved, the wire E beneath it becomes a live wire, and any of the keys C of that political party can take a current from their top side when the circuit is closed.

Each of the keys C has a peculiar construction which I indicate diagrammatically in Figs. 22, 23 and 24. As will be seen by reference thereto, each key C consists of the central shaft O, which is turned from the left over to the right a distance of 90 degrees when the key is operated or set. This shaft O, or at any rate a portion of it, is composed of insulating material, through which passes a T-shaped strip or block P of some metallic conductor, such as brass. Upon this insulating portion of the shaft O is rotatably mounted a sleeve or annulus Q, the body of which is also of insulating material, which has set therein three strips R of some conducting material, and so spaced apart as to correspond in location to the ends of the T-shaped strip or block P. The sleeve Q is so mounted on the shaft O that as the shaft is turned from its unoperated to its operated position, the sleeve Q is necessarily carried with it through the same distance, that is to say, 90 degrees. Conversely, when the sleeve Q is moved backward from its operated to its unoperated position, it carries with it the shaft O. The sleeve Q, however, is mounted on the shaft sufficiently independently thereof so that it can be moved forward through an angle of 90 degrees and to its operated position without carrying with it the shaft O. All of these sleeves in each candidate row, are connected together by a link not shown in the diagrammatic figures, but to be subsequently described, so that as any key in any horizontal row is rotated forward to its operative position, all the sleeves Q of that row will be rotated forward to operative position, while all the shafts O of that particular row will remain in their unoperated position, except the shaft P of the particular key which has been operated. It will thus be seen that it is possible for three different combinations of the positions of the shaft O and the sleeve Q to be effected. The connections F, G and H are arranged relative to the sleeve Q as above described relative to the key C, the sleeve Q being considered as the outer portion of the key.

The theory of the operation of the device will now be readily apparent. Supposing that any vertical column of keys, which represent all the candidates of any political party, are unoperated, except that the straight ticket key N has been operated making the wire E beneath it a live wire when the circuit of the entire machine is closed. All of the keys will have both the shaft O and the sleeve Q unoperated, the parts being in the position shown in Fig. 22. It will be apparent then that the scratched current from the branch F is insulated so far as that key is concerned. However, the branch key from the straight ticket wire has one of the contacts R and the conductor P so located that the current can pass through the uppermost conductor R, into the conductor P, out through the side conductor R and into the branch H, whence it passes through the magnet, actuating the register, and thence back through the wire L, trunk M and to the battery A. Consequently, all the registers in the vertical column in which the straight ticket has been voted will be actuated by the straight ticket current, provided that none of the shafts O have been moved by the actuation of a key or none of the sleeves Q by the actuation of its key or any other key in that horizontal row. If, however, after setting the straight ticket key, it is desired to scratch any candidate in that column, and vote for the candidate of some other party, all that is necessary is to set or operate the key for the particular candidate of the other party that it is desired to vote for. The key of that particular candidate will then be in the position shown in Fig. 23, where it will be seen that the straight ticket current is insulated, even if it were turned on, as it is not, but the positions of the shaft O and the sleeve Q are such that the scratched current can pass through the branch F, the left hand contact R, the conductor P, the right hand contact R, thence through the branch H and the electro-magnet and back to the battery as before.

The condition of the key for the candidate that has been scratched from the straight ticket row is shown in Fig. 24. Here it will be seen that the straight ticket current is insulated by means of the sleeve Q, while the scratched ticket current passes into the left hand contact R of the sleeve, but is insulated by the body of the shaft O from the conductor P, so that there is no possibility of either the straight or scratched current getting through this key to actuate the register.

By a consideration of this system, it will readily be seen that I have devised a simple construction for permitting either straight ticket or scratched voting, when desired, with a minimum operation of the keys in the minimum time, and without the necessity of providing any interlocking mechanism, except between the keys of the horizontal rows, i. e., between the straight ticket keys, and between the keys for the candidates for the same office. By this system, it will be seen that I am enabled to scratch any or all candidates that may be desired either before or after operating the straight ticket desired, and thus I am enabled to operate my machine with the greatest possible rapidity, and with a minimum expenditure of energy.

Still referring to the diagrammatic view, it is desirable to provide for multi-candidate or grouped voting, in such cases as school trustees, judges, or other offices where two or more officials are to be elected, and each party nominates as many candidates as there are offices to be filled. In this case it becomes necessary to provide means for permitting the operation of only the number of keys that there are candidates to be elected, while permitting the operation of any possible combination of the keys. For instance, in the group of keys which I have lettered CM, there are three officials to be elected for the same office, and the keys must be arranged so as to permit the operation of any three of the keys, even though they should all be in the same horizontal row. For this purpose, I may omit the ordinary interlocking mechanism in the horizontal row of keys, and provide a multi-candidate controlling device, substantially such as shown in my application No. 703,068, above referred to. In the device there employed, if the voter sets the keys for more than the number provided for by law, mechanism was arranged to automatically cut off the current of air from the group, and similarly in the present device, I provide mechanism for cutting off the current of electricity from the group, and this construction is referred to in this place simply to indicate the general plan thereof. In the return wires L, just above and below the group, I provide the switches S, two in each column, the upper ones being connected by a horizontal rod T, and the lower ones being connected by a similar rod T, and the positions of both rods T being controlled by the multi-candidate mechanism to be subsequently described. At the right of each of the keys of this particular group in each column is a supplemental wire U, which is normally insulated and disconnected from everything. When the rods T are pushed to the right, as they will be by the operation of the multi-candidate controlling mechanism when the voter has operated the keys for more candidates than he is entitled to vote for, the switches S are moved so as to cut out that portion of the return wire L adjacent to the electro-magnets J of the group, and to bring said switches into contact with the ends of the wire U, so that the return current is switched around this group of keys, so as to prevent any of them being actuated, while permitting the actuation of any keys beneath the group. Just beneath this group of keys CM, I have another multi-candidate group in which six officials are to be elected, and it will be seen that the construction of this group is the same as that of the previous group, the only difference being in the number of keys included, and in the arrangement of the multi-candidate controlling device to be subsequently described.

In some of the States, provision is made for voters having a limited franchise, as, for instance, in the State of Illinois, the women are permitted to vote for the three candidates for trustees of the State University. The multi-candidate group containing the registers CM which have just been considered may be used for these university trustees, and in that case I show diagrammatically a construction which may be employed to permit voters of limited franchise to use the machine without there being any possibility of their casting ballots for any officials for whom they have no right to vote. For this purpose, I provide the additional wires V leading from the trunk wire B, and each of these wires V terminates in a contact point W adjacent to the end of a switch X arranged in the scratched current wire D just above the group. A similar switch Y is located in each of the straight current wires E adjacent to the switch X, and a rod Z similar to the rod T passes across the machine horizontally connecting all of these switches. In order to cut out the keys beneath the group, I provide the switches XL and YL which are similar in every respect to the switches X and Z, and are likewise connected by a rod ZL similar to the rod Z. To cut out the keys above the group, I provide the switches YU and XU, similar to the other switches and all connected by a rod ZU which it will be seen serve to switch the current from the straight ticket wires E to the extra wires V, and to break the scratched wires D. Before a voter of limited franchise enters the machine, the judges of the election move the rods ZU, Z, and ZL an exact distance to the left, which distance will be regulated by the mechanism controlling said rods, which may conveniently consist of a handle ZH accessible to the judges and secured to the rigid bar ZB secured to the ends of the rods, and in this position the straight ticket wires E are broken above and below the group, while the scratched current wires D are broken above and below the group, but the switches X are thrown so as to close the circuit through the contact W, so that the scratched ticket current for the keys of this group can be received from the wires W, but all of the other keys are completely shut out.

The two uppermost rows of keys CA are devoted to amendments to the constitution or other propositions which are voted upon independently of any party considerations, and these are connected only with the scratched current wires D. The three keys in each horizontal row may be used in voting yes, no, or no choice, in case the amendment keys are interlocked with the candidate keys so as to compel the voter to operate one of them before he can operate any of the candidate keys, as provided for in my application No. 703,068, above referred to. These keys CA are constructed so far as the interlocking mechanism between them is concerned the same as the keys C, but they may be simply cut out keys, the same as the keys N, except that the conducting material must be placed at an angle of 90 degrees from that of the keys N, owing to the fact that the contacts F and H are horizontal, instead of vertical as is the case with the contacts of the keys N. Of course, it will be understood that the position of the contacts of these keys CA and N is immaterial, as the only requirement is that they act as cut outs to normally break the circuit, which is closed when they are operated.

A switch A' is placed in the trunk wire B, or in the wire M, as may be convenient, and this switch which is normally open is arranged to be closed once for an instant, and then opened as the voter leaves the booth, and to be open as another voter enters, the closing of the circuit once between the entrance of two voters being necessary in order to actuate the registers. Of course, it will be understood that I might arrange to have the switch A' closed after the exit of each voter by the election officials, but I preferably construct the machine so that the switch is closed automatically for an instant by the opening of the door of the booth as the voter leaves it.

Referring to Figs. 1 and 2, I show therein a booth specially adapted to receive the voting machine, although it will be understood that my invention can be employed in connection with any sort of a booth or room that may be required, the only feature that is especially desirable, or absolutely necessary, according to the laws of some States, being that the booth shall be so constructed as to sufficiently conceal the voter while he is operating the machine so as to prevent anybody from learning how he voted. I preferably form the booth B' in the form of a rectangle, which is divided into two compartments by the front plate C' and the rear plate D', both of which preferably extend from the top to the bottom of the booth, and nearly across the same, as clearly shown. The rear compartment is inaccessible while the election is being conducted, as its door E' is locked, preferably by a plurality of different locks, the keys of which are in the hands of the election officials of the different parties, so as to prevent any surreptitious entry to the machine. The door F', which is used by the voter, may also be provided with a lock to prevent the entry to the front compartment except by persons duly authorized during the conduct of an election. This door F' I preferably form as a sliding door, which has the antifriction rollers G' at its top mounted to roll upon the bar H' which supports it, in the customary manner in which elevator doors are mounted.

To insure the complete opening and closing of the door as each voter enters or leaves the booth, and to prevent any manipulation of the machine, I employ mechanism compelling the complete opening of the door after it is started, and likewise the complete closing of the door. This mechanism consists of a dog J' pivoted upon the bar H' so as to hang downward and swing freely in either direction. This dog coöperates with the rack bar K' formed or placed upon the top of the door, and extending substantially the width of the door. When the door is moved to the right to open it, as seen in Fig. 2, the first tooth of the rack K' will engage the dog J' and swing its lower end to the right, and the teeth of the rack project upwardly into the plane occupied by the dog sufficiently to prevent the dog assuming a perpendicular position again until the door has been completely opened, and the teeth of the rack bar are past the dog J', which then swings to a perpendicular position, so as to be ready to be engaged on its other side and swung to the left by the other side of the rack teeth as the door is closed. It will be perceived that with this construction, when once the door is started to be opened, it must be completely opened, and when it is once started to be closed, it must be completely closed.

In the normal operation of the machine, the door is open when a voter enters it, and the keys and voting mechanism are locked from movement by the voter while the door is open by mechanism to be subsequently described. After entering the booth, he is compelled to completely close the door, as the machine is not unlocked until this is done. With the door closed, so that nobody can see how he manipulates the keys, he can set them to register his vote, but no action of the registers occurs until he leaves the booth, as the circuit is closed as soon as he starts to open the door, but inasmuch as he cannot then close the door without completely opening it, he cannot operate the machine more than once without attracting the attention of the election officials.

The ballot, which comprises the names of all the candidates arranged in party columns and candidate rows, is placed upon the front of the plate C', with the keys C occupying positions relative to the name corresponding to the positions of the squares and crosses in the ordinary Australian ballot, of which the present machine may be described as a mechanical embodiment. The interlocking mechanism to prevent the operation of more than the allowed number of keys is arranged between the plates C' and D', while the contact portions of the keys are located in the partially closed space formed in the rear of the plate D' by the horizontal cross pieces L' and M', which are connected by the vertical insulating strips N', which will be described in greater detail hereafter. The frame work formed by these vertical insulating strips N' is partially closed by the various angle irons O' which form supports for the electro-magnets and their coöperating registers.

Referring more especially to Figs. 3 to 8, it will be seen that the keys C are composed of the shaft O previously referred to, and upon the outer end of this shaft is secured the lever P' and its knob Q'. The shaft O passes through the circular apertures R' in the plate C' and just on the other side of the plate C' is rigidly secured thereon, or formed integral therewith, the enlarged square portions S', which coöperate with the long leaf springs T' which are fastened to the top and bottom sides respectively of the blocks U' secured to the rear face of the plate C'. These leaf springs T' have their ends free for a sufficient portion of the length of the springs so that as the key is turned, the springs which normally tend to hold it in its unoperated position are put under tension during 45 degrees of its movement from the left over to the right, and during the remaining 45 degrees of the movement, the tension is relaxed until the key reaches its operated position, 90 degrees from its unoperated position, in which position the springs T' have assumed their normal position. It will readily be seen that the action of these springs is to hold the key in its operated or unoperated position, and if by any chance it is left slightly away from either of these positions, the springs will automatically return it to its nearest position.

For an interlocking mechanism to prevent the actuation of more keys than is permitted, I provide substantially the same mechanism as shown in my prior application No. 703,068, previously referred to. For the straight ticket keys, the amendment keys, and the single office keys, I employ a cable V', which is securely fastened at its ends to the inside wall of the plate D', as shown in Fig. 8, and which passes through the short tubes W' which are screwed into or formed integral with the body of the shaft O. The cable V' has just sufficient slack to permit of the turning of one of the keys from its unoperated to its operated position, and if another key in the same row should be turned, the first one that is turned will be automatically restored to its original position.

For the multicandidate groups, such as the three trustees of the State University, I provide the interlocking mechanism illustrated especially in Figs. 3, 4, 9 and 10. In place of the tubes W', I rigidly secure to or form integral with the shafts O, the cross bar X', which in its unoperated position stands with the rounded nose pointing downward at an angle of 45 degrees to the left. This rounded nose coöperates with the end of the movable dog Y' which is pivotally secured in an aperture Z' formed in one end of the locking block $A^2$. These locking blocks have their right hand end formed with a semi-circular notch $B^2$ therein into which the end of the dog Z' projects, and the edge of this notch corresponds with the path of the rounded nose of the cross bar X'. These blocks $A^2$ are secured to slide upon the inner face of the plates D' by means of the metallic straps $C^2$ which hold them in position, although it will be understood that any other means might be employed. The left hand ends of these blocks, except the ones on the extreme left, are formed with the somewhat irregular shaped notch $D^2$ therein, the shape of which is clearly shown in Fig. 4. This notch $D^2$ has the projection $E^2$ formed therein for the purpose to be described. The dogs Y', which are pivoted at their inner ends, have the curved leaf spring $F^2$ placed beneath them in the pocket Z' so as to hold them normally in their upward position. As any key in this group is rotated from its unoperated to its operated position, the rounded end of the cross piece X' coöperating with the rounded outer end of the dog Y' serves to force the block $A^2$ on its left to the left a distance represented by the intersection of the curve described by the rounded end of the cross piece X' with the dog Y'. Of course, all the blocks $A^2$ to the left of the key being operated will be moved the same distance, so that in every case, the left hand block of that row will be moved the required distance, and the movement of these blocks serves to actuate the multi-candidate controlling device to be subsequently described. If it should be endeavored to beat the apparatus by moving two of the keys in the same row simultaneously, the block $A^2$ to the right of the left hand key being operated, will be forced to the left sufficiently so that the projection $E^2$ will contact with the square end of the cross piece $X'$ and prevent either of the keys being turned to operative position. It will be seen that after a key in any row has been operated, the blocks $A^2$ in that row will assume their normal position, owing to the action of certain springs to be subsequently described, the tension of which is always against the left hand ends of the blocks on the extreme left. The operated key being left in its operated position, another key in the same row can now be operated, and still another, if desired, the omission of the cable $V'$ permitting this. When the machine is re-set, it becomes necessary to turn all of these keys simultaneously, and if two or more keys have been operated in the same row, there would be the tendency to jam that occurs if two or more keys are attempted to be operated at the same time, and it is to prevent the possibility of this jamming, as well as any actuation of the multi-candidate controlling device when the machine is re-set that the dogs $Y'$ are pivoted and held upward by spring pressure. It will readily be perceived that as the keys are returned to their normal position, the springs $F^2$ being weaker than the springs to be referred to holding the blocks in place, will yield, and cause the dog $Y'$ to swing down without moving the blocks, and, consequently, no jamming action or operation of the multi-candidate mechanism can occur.

To secure a sufficiently elongated and rigid bearing or axle for some gear wheels or pinions to be described, I may extend the rods $G^2$ between the plates $D'$ and $C'$ and projecting on the other side of the plate $D'$, as shown in Figs. 7 and 8. In such case, it is necessary to make the slots $H^2$ in the blocks $A^2$ on the extreme left, through which slots the rods $G^2$ pass.

The multi-candidate controlling mechanism proper, seen in side elevation in Fig. 3, in a central section in Fig. 9, and in plan view in Fig. 10, is supported by the bracket $J^2$ which is secured to the end of the rear plate $D'$. This bracket has at its top and bottom horizontal arms $K^2$ and $L^2$ which terminate in bearings for the shaft $M^2$. This shaft $M^2$ has rigidly secured at its upper and lower ends the cup-shaped disks $N^2$ and $O^2$, and on the upper side of the disk $N^2$ and on the under side of the disk $O^2$ are secured the disks or plates $P^2$, the upper one of which is shown in elevation in Fig. 10. These plates, as will be seen, are removably secured to the disks $N^2$ and $O^2$ as by the screws $Q^2$ so that these disks can be changed for different controlling mechanisms. Each of these disks has therein a slot $R^2$, the main portion of which is concentric with the center of the shaft $M^2$ upon one radius, while the end $S^2$ thereof is concentric therewith on a slightly greater radius so that as the disk $P^2$ is moved from the full line position of Fig. 10 to the dotted line position, the anti-friction roller $T^2$ mounted upon a stud $U^2$ projecting from the under and upper sides respectively of the rods $T$ will be moved to the right a short distance, carrying with them the rods or bars $T$, thus moving the switches $S$ to carry the return current around the keys of this group and prevent any of them being actuated. In the construction shown and to be described, each movement of any one of the blocks $A^2$ upon the left serves to turn the disks $P^2$ from the right over to the left through an angle of 30 degrees, and the portion of the slot $R^2$ upon the shorter radius covering an angle of 90 degrees, the blocks $A^2$ can be operated three times, or, in other words, any of the keys in the multi-candidate group can be operated three times without shutting off the current. If, however, they be actuated four or more times, the end $S^2$ of the slot of the greater radius is brought around to the anti-friction rollers $T^2$ so that they are moved to the right and the current is shut off from the registers of this group.

A spirally coiled spring $V^2$ is secured at one end to the bracket $J^2$, while its other end is secured to the disk $O^2$ so that the spring always tends to revolve the disk $O^2$, and, consequently, the shaft $M^2$ from the right over to the left. Rigidly secured to the shaft $M^2$ and having a bearing upon the upper side of the arm $L^2$, is the arm $W^2$, which terminates in an escapement mechanism to be subsequently described. Journaled upon the shaft $M^2$ above the arm $W^2$ is the sleeve $X^2$, which terminates in an arm $Y^2$ similar to the arm $W^2$ and likewise provided with an escapement. Above the arm $Y^2$ is another sleeve $X^2$ and arm $Y^2$, and above this uppermost arm $Y^2$ is a sleeve $Z^2$, which corresponds in size and function with the sleeves $X^2$, but which is secured rigidly to or formed integral with the end of the bracket or arm $K^2$. Splined upon each of these sleeves $X^2$ and $Z^2$ is a sleeve $A^3$, which has secured to or formed on its lower end a disk $B^3$ with twelve teeth $C^3$, one of which is shown in plan view in Fig. 11, which are equally distant, and which coöperate with the escapement on the end of the arms $Y^2$ and $W^2$. These sleeves $A^3$ are provided with the channel or groove $D^3$ running around them, and the lugs $E^3$ projecting inward from the ends of the yokes $F^3$ forming the inner ends of the horizontal portions of the bell crank levers $G^3$ pivoted to the bracket $J^2$ at $H^3$, and having the ends of their substantially vertical arms $J^3$ resting against the ends of the blocks $A^2$ at the left. A strong coiled spring $K^3$ connected to the horizontal arms of the bell cranks and to the bracket $J^2$ serves to hold the sleeves $A^3$ in their lower position, and all the blocks $A^2$ in their right hand positions. The escapement on the ends of the arms $W^2$ and $Y^2$ consist of the upper bearing surface $L^3$ which is rigidly secured upon the vertical upright portion $M^3$ of the escapement. The lower bearing surface $N^3$ is secured to the vertical shaft $O^3$ mounted in bearings formed in the vertical portion $M^3$, and the body portion of the bearing surface $N^3$ fits into the notch $P^3$ formed in the vertical portion $M^3$. An arm $Q^3$ projecting at right angles from the bottom of the shaft $O^3$ has secured to its outer end a coiled spring $R^3$, the other end of which is suitably secured to the arm $W^2$ or $Y^2$ as by the pin $S^3$. The direction of the arm $Q^3$ and the location of the spring $R^3$ is such as to hold the lower bearing surface $N^3$ normally in the position shown in Fig. 11, but permits it to be moved to the position shown in dotted lines in Fig. 11.

The operation of the mechanism is as follows: The arm $W^2$ being rigidly secured to the shaft $M^2$ tends to rotate from the right over to the left under the stress of the spring $V^2$. In normal position, it rests with the lower side of the lower contact surface $N^3$ against one of the teeth $C^3$, as shown in Fig. 11, and the contact of this surface with the teeth prevents any further movement of the arm $W^2$ and, consequently, of the shaft $M^2$ and its connected parts. Suppose now that a key is operated in the lower row of the multi-candidate group. The bell crank $G^3$ will be rocked and the yoke $F^3$ raised so that the sleeve $A^3$ and, consequently, the teeth $C^3$ on the disk $B^3$ will be raised out of the plane of the lower bearing surfaces $N^3$ into the plane of the upper bearing surface $L^3$. As soon as the lower bearing surface $N^3$ is released by the movement of the teeth $C^3$, the spring throws the arm $W^2$ forward until the upper bearing surface $L^3$ contacts with the tooth $C^3$ from which the lower bearing surface $N^3$ has just escaped. As the sleeve $A^3$ and the disk $B^3$ descend under the tension of the spring $K^3$ as soon as the key has been moved, the upper surface $L^3$ is released from the tooth with which it has contacted, and the arm $W^2$ advances again until its lower bearing surface $N^3$ comes in contact with the next tooth. It will be seen that the shaft $M^2$ is thus rotated through the angular distance between two of the teeth $C^3$, which in the structure shown is 30 degrees. Suppose now that a key in the second row of the multi-candidate group be operated, the effect will be the same, except that the arm $Y^2$ is the one to be directly advanced, and the power to advance it is obtained from the tension of the spring $V^2$, inasmuch as the sleeve $A^3$ is splined on the sleeve $X^2$ to which the arm $Y^2$ is rigidly secured. Consequently, the arm $Y^2$ advances synchronously with the arm $W^2$, and the shaft $M^2$ is thus advanced another 30 degrees. Similarly, an actuation of the key in the upper row will permit the advance of the uppermost arm $Y^2$, and also of the lower arms $Y^2$ and $W^2$, so that again the shaft $M^2$ is advanced another 30 degrees. If, however, a key in each of the three rows should be simultaneously operated, each of the escapements would operate, and the upper arm $Y^2$ would move 30 degrees by its own escapement. The middle arm $Y^2$ would move 60 degrees, 30 degrees by its own escapement and 30 degrees by the escapement of the arm $Y^2$ above it. The lowermost arm $W^2$, and, consequently, the shaft $M^2$ to which it is rigidly attached, would move a total of 90 degrees, 30 degrees from its own escapement and 30 degrees each from the escapements of the arms $Y^2$ above it. As previously explained, if the shaft $M^2$ is moved for the three steps or 90 degrees only from its initial position, the multi-candidate group is not cut out. If, however, the keys in the multi-candidate group should be operated four or more times, the shaft $M^2$ and the disks $P^2$ will be moved 120 degrees, and, consequently, the current will be cut off from the multi-candidate group by the mechanism above described. To re-set this multi-candidate controlling device, the disks $P^2$ are provided with teeth on their periphery extending through about 120 degrees, or more if the slot $R^2$ is longer. These teeth are normally in the position shown in full lines in Fig. 10, so that the two sets of rack teeth $T^3$ carried by the door do not engage them, as the door is closed. If, however, the keys in the multi-candidate group have been operated so as to move the disks $P^2$ from their normal position, these teeth are in the path of the racks $T^3$ and are, consequently, engaged thereby so as to rotate the disks $N^2$ and $O^2$ against the stress of the spring $V^2$ to return the parts to normal position. In order to permit this return of the parts, I make the lower bearing surface $N^3$ yielding in one direction, as described above, and as soon as the disks $N^2$ and $O^2$ have been returned to normal position, the racks $T^3$ can not engage with the teeth on said disks and said disks are held from backward movement by the contact of the bearing surfaces $N^3$ with the teeth $C^3$ on the disks $B^3$.

Having now described the interlocking mechanism, which is located between the plates $C'$ and $D'$, I will next describe the register actuating mechanism. As previ- ously stated, the vertically supporting and insulating pieces N′ have the angle bar shelves O′ fastened thereto, as clearly shown in Fig. 3, each shelf extending from one piece N′ to the adjacent piece, the relative positions of the shelves and pieces being shown in Figs. 7 and 8, so that the series of shelves extending across the machine form practically one continuous shelf. Each shelf is provided with two pairs of electro-magnets $V^3$, suitably secured to the shelf, and coöperating with each pair of the electro-magnets is an armature $U^3$ supported by a bell crank lever $W^3$ pivotally secured to the vertical portion of the shelf, and normally held away from the poles of the magnet by the coiled spring $X^3$ which is attached at one end to the vertical arm of the bell crank $U^3$ and at the other end to a post $Y^3$. The outer end of the horizontal arm of the bell crank $W^3$ is furnished with an operating pawl $Z^3$, which is preferably of the three-pronged variety adapted to coöperate with the group $A^4$ of deep-notched registering wheels. The particular details of the construction of these wheels form no part of my invention, and it need only be said that as the circuit is closed and the magnet $V^3$ energized, the armature $U^3$ being drawn to the poles against the resistance of the spring $X^3$, the pawl $Z^3$ operates the set of registering wheels $A^4$ to count one thereon. When the circuit is broken, the spring $X^3$ restores the parts to their normal position ready to advance the registering wheels another step when the circuit is closed again. In order to economize on vertical space, I preferably place two sets of registers on each shelf, the shelf occupying the vertical space of two of the keys.

The shafts O of the keys extend through suitable apertures in the plate D′, and have rigidly secured on their outer ends the insulating sleeve or portion $B^4$, which is cylindrical and square at its outer end while its inner end has a shoulder $C^4$ thereon extending through an angular space of 90 degrees. This shoulder $C^4$ coöperates with a similar shoulder $D^4$ upon another insulating sleeve $E^4$ which is mounted to rotate on the key shaft O between the sleeve $B^4$ and the plate D′. The shoulder $D^4$, however, extends through an angular space of 180 degrees, so that it is possible to rotate the sleeves $B^4$ and $E^4$ through an angle of 90 degrees relative to each other, the action being the same as that previously described between the shaft O and the sleeve Q. The inner end of the sleeves $E^4$ are provided with the set of gear teeth $F^4$ thereon, which in fact make a gear pinion. A sliding bar $G^4$ secured in suitable supports on the rear face of the plate B′ has rack teeth on all or parts of its under side meshing with the teeth $F^4$, so that as any sleeve $E^4$ is rotated its movement by means of the bar $G^4$ will be transmitted to all the other sleeves in the same horizontal row, so that as any key is turned to set it, its sleeve is carried with it through the angle of 90 degrees, and at the same time all the other sleeves in the same horizontal row are also carried through an angle of 90 degrees. On the contrary, if power be applied by any means to the bar $G^4$ after it has been advanced to re-set it, as it is moved back, it will rotate backward all the sleeves $E^4$ of that row, and by means of their shoulders $D^4$ coöperating with the shoulder $C^4$ of the key that has been operated will re-set or return the key to its normal position. For the purpose of moving all these bars $G^4$ simultaneously to re-set them, I employ the following mechanism.

Journaled on the rods $G^2$ are the gear pinions $H^4$, which mesh with the vertically sliding rod $J^4$ suitably mounted upon the rear side of the plate D′ just outside of the rods $G^4$. Between the gear pinions $H^4$ and the plate D′ are the gear pinions $K^4$ which are loosely mounted on the rod or shaft $G^2$. The pinions $K^4$ have a pin $L^4$ rigidly secured therein or formed integral therewith and projecting into the segmental slot $M^4$ made in the pinion $H^4$. At the top of the vertical row of pinions $H^4$ and $K^4$ is a gear pinion $N^4$ of the same size, but as broad as both the pinions $H^4$ and $K^4$ together. The bar $J^4$ meshes with this pinion $N^4$ and a rack bar $O^4$ suitably supported by straps $P^4$, or otherwise upon the rear side of the plate D′, meshes with the teeth on the under side of the gear pinion $N^4$. This rack bar $O^4$ may have its outer end provided with an anti-friction roller $Q^4$ which coöperates with the wedge surface $R^4$ formed on the inner edge of the door F′, as shown in Fig. 2. A strong coiled spring $S^4$ connected at its upper end to a pin $T^4$ on the vertical rack bar $J^4$ is connected at its other end to the rear side of the plate D′ so that it tends to pull the bar $J^4$ downward.

When the door of the booth is closed, the inclined surface $R^4$ and the door are out of engagement with the anti-friction roller $Q^4$ so that it stands in its outermost position, being drawn into this position by the action of the spring $S^4$ pulling the rack bar $J^4$ down, which rotates the gear pinion $N^4$, which meshing with the rack bar $O^4$ shoves it outward. In this position, any of the keys can be turned from their inoperative to their operative position, and as they are turned, they will carry all the sleeves $F^4$ of that row with them, and the gear pinions $K^4$ will be rotated from the left over to the right so that the pins $L^4$ occupy a position at the upper ends of the slots $M^4$. As soon as the door is opened, the incline $R^4$ engages with the anti-friction roller $Q^4$ and shoves the bar $O^4$ to the right, and thus the rack bar J⁴ is carried up and its engagement with the pinions H⁴ rotates all of them from the right over to the left through an angle of 90 degrees so that the engagement of the upper end of the slots M⁴ with the pins L⁴ of the pinions K⁴ that have been turned serves to return all these pinions K⁴, and, consequently, all of the rack bars G⁴ to their normal or unoperated position. When the door is opened, the anti-friction roller Q⁴ will ride on the surface of the door, and in this position, it will be seen that all of the keys are absolutely locked from movement. Consequently, as long as the door is open, and the voter is visible, he cannot manipulate the keys, and it is only by closing the door that they become accessible to him for voting purposes.

If the construction of the rack bars G⁴ and the gear pinions formed on the ends of the sleeves E⁴ were the same in the office rows for the multi-candidate groups, it would be possible to beat the machine by operating the straight ticket in any column which would permit the straight ticket current to operate all the multi-candidate registers in that column, except such as might be scratched by the operation of one or more registers in other rows. For instance, if a voter in a multi-candidate group of three should vote a straight ticket, and then vote for three candidates of three different parties in the same office row, he would succeed in getting votes counted for five candidates instead of the three to which he was entitled. In order to prevent this, it is necessary to arrange the racks G⁴ in the multi-candidate group so that the operation of any key in the group will move all of the racks. This may be accomplished by two or more vertical cross pieces connecting the racks, thereby making them a rigid frame, but I preferably accomplish the same result in a somewhat better manner by placing two or more vertical racks U⁴, preferably one for each party column, on either side of the gear pinions formed on the sleeves E⁴, and just beyond the racks G⁴, the rocks U⁴ coöperating with these broad pinions in the same plane as does the rack J⁴ in the column of re-setting gears. These racks U⁴ are suitably supported in straps or bearings projecting from the rear of the plate D'.

The insulating supporting columns N' are formed with what may be called horizontal teeth V⁴ which project between the innermost ends of the keys C, and serve to carry the branches F, G and H, which, as seen in Figs. 3 and 15 to 20, I preferably make in the form of leaf spring contacts, which are suitably connected to their respective wires D, E and L, which are carried by the supports N', by metallic washers and screws, as is customary in making such electrical contacts. Referring to the diagrammatic Figs. 22 to 24, it will be seen that the key shaft O carries a three-point contact while the sleeve Q carries three contact strips, and these diagrammatic views are shown as being the simplest form in which this can be placed. In actual practice, however, I prefer to place the three-point contact upon the sleeve E⁴, and this contact, as shown in Figs. 15 to 20, is in the form of a metallic strip W⁴ extending around about 300 degrees of the periphery of the sleeve and provided with the three contact points or strips X⁴ which are equally spaced apart at a distance of substantially 90 degrees from each other. The three separate contact strips I place upon the sleeve B⁴ fixed to the innermost end of the key shaft, and these thin metallic strips Y⁴, like the strips X⁴, are secured upon the surface of the sleeves composed of insulating material, and are spaced apart the same distance as the contact points X⁴. To insure perfect contact being made between the adjacent ends of the contact strips X⁴ and Y⁴, I secure three leaf spring brushes Z⁴ to the teeth V⁴ and arrange them so that they will contact with the junctions of the strips Y⁴ and X⁴ in any of the three positions in which it may be necessary for contact to be made.

By a careful consideration of the relative positions of the parts as shown in Figs. 15 to 20, in which Figs. 15 and 16 correspond to the unoperated position of the key and sleeve intended for voting the straight ticket, Figs. 17 and 18 correspond to the position of the key and sleeve both moved to the scratched position, and Figs. 19 and 20 corresponding to the position of the unoperated key and operated sleeve to prevent a vote being cast, it will be seen that in the first position, the current will pass from the wire E to the contact G, into the uppermost strip Y⁴, thence through the uppermost strip X⁴, into the connecting strip Y⁴, out through the right hand side strip X⁴, into the right hand side strip W⁴, through the contact H, through the electromagnet, and thence into the wire L. It will be observed that in this position neither of the strips X⁴ and Y⁴ are at the left hand side position so that the strip Y⁴ could not take any current from the contact F.

In the second position, in which the key has been moved and the sleeve has been moved, the current passes from the wire D, through the contact F, into the left hand side strip Y⁴, into the left hand side strip X⁴, thence into the strip W⁴, through which it passes down underneath the sleeve and up to the opposite side to the right hand strip X⁴, thence out the right hand side strip Y⁴, into the contact H, thence through the electro-magnet and to the return wire L. In this position of parts, it will be seen that neither of the strips X⁴ or Y⁴ is beneath the contact G, so that it is impossible for any straight ticket electricity to pass into the machine, even if the current were turned on.

In the third and last position that need be considered, the one in which the key has not been moved, but in which the sleeve has been moved, the three contact surfaces $Y^4$ are at the right and left hand sides and bottom respectively, while the three strips $X^4$ are at the top and bottom and right hand side. In this arrangement of parts, no scratched current can be received, as while the contact F is in engagement with the strip $Y^4$ which is on the left hand side, none of the strips $X^4$ are on that side, so the scratched current stops in the left hand side plate $Y^4$. The straight current in the contact G is not effective, because there is no contact $Y^4$ beneath it, and, consequently, inasmuch as neither the straight nor scratched current is accessible, the circuit cannot possibly be closed, and, consequently, the register cannot be operated.

Referring again to Fig. 2, the details of the automatically operated switch $A'$ are shown. The wires B and M are shown as bringing the current from outside the booth, as if from an electric light wire, which will be conveniently employed in the cities. In smaller places powerful galvanic batteries can be employed. The switch $A'$ consists of a block $A^5$ of insulating material, which may conveniently be of an inverted U-shape. One end of the wire B is connected to the leg $B^5$ which is pivotally connected to the block $A^5$ and normally held in its vertical position by gravity and the spring $C^5$ interposed between the legs. This end of the wire terminates in the contact $D^5$. The other end terminates in a spring terminal $E^5$ in the other leg $F^5$. When the door is started open, and before the resetting mechanism comes into action, the lug $G^5$ formed on the bracket $H^5$ supporting the door $F'$ strikes the leg $B^5$ and swings it until the terminals $D^5$ and $E^5$ meet, as the lug $G^5$ forces itself past the leg $B^5$, thus closing the circuit and operating such registers as have their controlling keys set for operation. As the door is closed again, the switch is unaffected, and as it is protected by the screen $J^5$, the voter cannot manipulate it *ad libitum* to beat the machine.

From a consideration of the foregoing parts and their operation under the various positions, it will readily be seen that it is impossible to cast votes for more candidates than the voter is entitled to, and also that a scratched vote can be cast with a minimum of effort, as all that is necessary is to operate the straight ticket key, and then scratch off the candidates not voted for, in the customary manner of operating the Australian ballot. While I have indicated the position of the various wires D, E and L, upon the supports X, I have not shown all the details of the connections, as it is considered unnecessary in view of the diagrammatic Fig. 21, which shows the nature of the connections more clearly than could be indicated by showing in detail the connections actually employed.

While I have herein shown and described a structure comprising a series of candidate keys devoted to a single office and freely movable into and out of operative position, and a corresponding series of ballot-indicating devices controlled thereby, together with connections between said keys whereby any key in operative position will be positively and directly returned to inoperative position by the subsequent operation of another key in said series by the same voter, I do not herein claim the same, as it is claimed in my application No. 655,060, filed October 13, 1897.

While I have herein shown and described a voting machine comprising the combination with a series of keys, of a multi-candidate device actuated one step for each key operated, whether said keys are operated *seriatim* or simultaneously, I do not herein claim the same, as the same is claimed in my application No. 374,452, filed May 20, 1907, which application is a division of my application No. 655,060, filed October 13, 1897.

While I have illustrated my invention as applied to that class of registering mechanisms employed to count votes in an election, it will be apparent that it might be used for any similar purpose in which a plurality of registers are used for counting.

While I have shown my invention as embodied in the form which I at present consider best adapted to carry out its purposes, it will be understood that it is capable of many modifications, and that I do not desire to be limited in the interpretation of the following claims except as may be necessitated by the state of the art.

What I claim as new, and desire to secure by Letters Patent of the United States, is:

1. In a voting machine, the combination with a series of candidate keys grouped according to parties, and a corresponding series of ballot indicating devices, of straight ticket keys, one for each party, an electric current for operating said ballot indicating devices, and two conductors for said current applicable to each ballot indicating device, the straight ticket key controlling the current in one conductor, and the candidate keys controlling the current in the other conductor.

2. In a voting machine, the combination of a register, means for operating it by a current of electricity, with a straight ticket key, and a candidate key, and two conductors carrying electricity to said register for operating it, one controlled by the straight ticket key and the other by the candidate key.

3. In a voting machine, the combination with a series of keys movable into and adapted to remain in operative or inoperative position and a corresponding series of registers, of an electro-magnet for actuating each register step by step, a switch for each magnet controlled by the position of its coöperating key, and an electric circuit capable of being closed by any of said switches for operating any desired register.

4. In a voting machine, the combination with a series of keys and a corresponding series of registers, of an electro-magnet for actuating each register, and a switch for each electro-magnet controlled by the position of its key, interlocking devices to control the operation of said switches, and an electric circuit for actuating said electro-magnets controlled by said switches, substantially as described.

5. In a voting machine, the combination with a series of keys movable into and adapted to remain in operative or inoperative position and a corresponding series of registers, of an electro-magnet for operating each register, and a switch for each electro-magnet controlled by the position of its key, interlocking devices applied to said keys to control the operation of said switches and prevent the actuation of more than the prescribed number of registers, and an electric circuit carrying a current for actuating said electro-magnets and controlled by said switches.

6. In a voting machine, the combination with a series of keys movable into and adapted to remain in operative or inoperative position and a corresponding series of registers, of an electro-magnet for actuating each register and a switch for each electro-magnet controlled by the position of its key, and a circuit connected with all of said switches for actuating said electro-magnets, said circuit being opened or closed, as may be desired, by the opening of the door to permit the exit of the voter from the booth.

7. In a voting machine, the combination of a series of candidate registers, selecting apparatus for said registers, with electric motors such as an electro-magnet for actuating said registers and an electric current for said motors, and a compound switch for each motor controlling the current thereto, one member of said switch being connected to and controlled by the position of the selecting apparatus, and the other member of all of the switches being connected and moved in unison by any actuation of the selecting apparatus.

8. In a voting machine, the combination of a series of candidate registers and a corresponding series of keys, with electric motors such as an electro-magnet for actuating said registers and a current for said motors, and a compound switch for each motor controlling the current thereto, one member of said switch being connected to and controlled by the position of its key, and the other member of all of said switches being connected and moved in unison by the actuation of any key.

9. In a voting machine, the combination of a series of candidate registers and coöperating keys, with actuating mechanism for said registers and means for moving said actuating mechanism, and a compound switch for each actuating mechanism controlling its operation, one member of said switch being connected to and controlled by the position of its associated key, and the other members all being connected and moved in unison by the actuation of any key.

10. In a voting machine, the combination of a series of candidate registers, selecting apparatus for said registers, with electro-magnets for actuating said registers and an electric current for said magnets, and a compound switch for each electro-magnet controlling the admission of the current thereto, one member of said switch being connected to and controlled by the position of the selecting apparatus, and the other member of all of the switches being connected and moved in unison by any actuation of the selecting apparatus.

11. In a voting machine, the combination with a series of registers and electro-magnets for actuating the same, of a circuit for supplying a current of electricity to said electro-magnets, and controlling mechanism for said electro-magnets to prevent the operation of any of them when more than a predetermined number of keys is indicated for operation.

12. In a voting machine, the combination of a series of keys devoted to candidates for the same office, with a corresponding series of ballot indicating devices and electro-magnets for operating said ballot indicating devices, and current controlling switches connected so that the movement of any one key will move all of said switches.

13. In a voting machine, the combination of a series of rotary keys devoted to candidates for the same office, with the rotary current controlling sleeves or switches having the gear pinions therein, and the rack bars connecting said gear pinions so that the movement of any key will move all of said sleeves or switches.

14. In a voting machine, the combination of a series of keys devoted to candidates for the same office, corresponding series of ballot indicating devices and electro-magnets for operating said devices, with the current controlling members or switches connected so that the movement of one key will move all of said members, and re-setting mechanism connected with said current controlling members so that the operation thereof will re-set any of said keys.

15. In a voting machine, the combination of several rows of keys devoted to candidates for the same office, with a corresponding number of ballot indicating devices and electro-magnets for operating said devices, and current controlling members or switches for each key connected so that the movement of any key will move all of said members.

16. In a voting machine, the combination with a series of registers in a multi-candidate group, electric motors such as an electro-magnet for actuating the same, selecting mechanism operated by the voter, an electric current for operating said motors, of multi-candidate mechanism actuated by the operation of the selecting mechanism, and a cut out device controlled by said multi-candidate mechanism to cut out the current from the motors when the selecting mechanism has been over-operated.

17. In a voting machine, the combination with a series of registers in a multi-candidate group, electric motors such as an electro-magnet for operating the same, selecting mechanism operated by the voter, and an electric current for operating said motors, of multi-candidate mechanism actuated by the operation of said selecting mechanism, and a cut out or switching device controlled by said multi-candidate mechanism and operated positively to cut out or switch off the power from the motors when the selecting mechanism has been over-operated.

18. In a voting machine, the combination with a series of registers in a multi-candidate group, electric motors such as an electro-magnet for operating the same, selecting mechanism operated by the voter, and an electric current for operating said motors, of multi-candidate controlling mechanism actuated by the operation of the selecting mechanism, and a cut off device controlled by said multi-candidate mechanism comprising the series of switches connected to be moved in unison, said switches when open serving to cut off the current from said motors.

19. In a voting machine, the combination with a series of registers comprising among others a multi-candidate group of registers, electric motors such as an electro-magnet for actuating the same, selecting mechanism operated by the voter, and an electric current for operating said motors, of multi-candidate mechanism actuated by the selecting mechanism for the multi-candidate group, and a cut out or switching device controlled by said multi-candidate mechanism to cut out the power from the multi-candidate motors while permitting it to pass to the motors of the remaining registers.

20. In a voting machine, the combination with a series of registers comprising among others a multi-candidate group of registers, electric motors such as an electro-magnet for actuating the same, selecting mechanism operated by the voter, an electric current for operating the motors, and two conductors for said current, one conductor being connected to the multi-candidate motors and the other having no connection therewith; of multi-candidate mechanism actuated by the selecting mechanism for the multi-candidate group; and a cut out or switching device controlled by said multi-candidate mechanism and comprising a switch to transfer the current from the conductor connected with the multi-candidate motors to the one not connected therewith.

21. In a voting machine, the combination of the plural series of ballot indicating devices and fluid power-actuated motors for operating the same, each series being devoted to candidates for a particular office, with means for applying said fluid power normally arranged to be available to any of said ballot indicating devices, and mechanism for cutting off the power from all of the ballot indicating devices in some of said series.

22. In a voting machine, the combination of the plural series of ballot indicating devices, each series being devoted to candidates for a particular office, with electro motors such as an electro-magnet for operating each of said ballot indicating devices, conductors and contacts normally arranged to supply current to any of said ballot indicating devices, and switch mechanism for cutting off the current from all of the ballot indicating devices in some of said series.

23. In a voting machine, the combination of the plural series of ballot indicating devices, such as the keys C and the electro-magnets J and their associated registers, each series being devoted to candidates for a particular office, with the wires D and contacts F for supplying current to the electro-magnets, and the switches X, XU and XL for cutting off the current from all of the ballot indicating devices in all but certain series of said ballot indicating devices.

24. In a device of the class described, the combination with a ballot indicating device and an electric motor, such as an electro-magnet, for operating the same, of a compound switch comprising a plurality of stationary contacts, with a movable member containing a corresponding plurality of separated contacts, and another member movable relative to the first and having a plurality of connected contacts.

25. In a device of the class described, the combination with a ballot indicating device and an electric motor, such as an electro-magnet, for operating the same, of a compound switch comprising a plurality of stationary contacts, with a movable member carrying a corresponding plurality of separated contacts, and another member movable relative to the first and having a plurality of connected contacts adapted to coöperate with the separated contacts of said first member.

26. In a device of the class described, the combination with a ballot indicating device and an electric motor, such as an electromagnet, for operating the same, of a compound switch, comprising a plurality of stationary contacts grouped in a circle, with a rotating shaft carrying on its surface a corresponding plurality of separated contacts adapted to engage with the stationary contacts, and a sleeve on said shaft separately rotatable thereon having a plurality of connected contacts on its surface coöperating with the separated contacts on the sleeves.

27. In a device of the class described, the combination with a ballot indicating device and an electric motor, such as an electromagnet, for operating the same, of a compound switch, comprising a plurality of stationary contacts, with a movable member carrying a corresponding plurality of separated contacts adapted to coöperate with said stationary contacts, another member movable relative to the first and having a plurality of connected contacts, and a plurality of conducting brushes so positioned as to insure the connection of the contacts of the two movable members in certain positions.

28. In a device of the class described, the combination with a ballot indicating device and an electric motor, such as an electromagnet, for operating the same, of a compound switch, comprising the stationary leaf spring contacts F, G and H, with the rotatable shaft carrying the separate contacts $Y^4$ on its surface adapted to coöperate with said leaf spring contacts in certain positions, the sleeve mounted on said shaft and carrying the contacts $X^4$ connected by the strip $W^4$, and the metallic brushes $Z^4$ insuring the connection of the contacts $X^4$ and $Y^4$ in certain positions.

29. In a voting machine, the combination with the keys movable from operative to inoperative position, of the springs coöperating therewith and tending to return the key to inoperative position if it has not passed a certain point in its movement and to carry it on to the limit of its operative position if it has passed said point, and registers corresponding in number to the keys, the operation of which is controlled by the position of the corresponding keys.

30. In a voting machine, the combination with the keys movable from operative to inoperative position, of the springs coöperating therewith and tending to return the key to inoperative position if it has not passed a certain point in its movement, and to carry it on to the limit of its operative position if it has passed said point, registers corresponding in number to the keys, and means for subsequently operating all of the registers whose keys are in operative position.

31. In a machine of the class described, the combination, with the revoluble escapement detent arm $Y^2$, of the laterally movable and relatively non-rotatable toothed escapement wheel $B^3$ for coöperating with said detent arm, and the detent member $N^3$ yielding in one direction.

32. In a device of the class described, the combination of the multi-candidate controlling mechanism comprising the cup $N^2$, with the slotted disk $B^2$ removably mounted upon said cup, and the reciprocating bar T having its end in engagement with said slotted disk, substantially as and for the purpose described.

33. In a voting machine, the combination of the rotary keys arranged in a row, with the sleeves mounted thereon and capable of the limited movement independently thereof, connections between said keys and sleeves to cause the movement of the keys in operating them to move the sleeves, and vice versa, bars operatively connecting all of said sleeves, and means to move said bars back to their normal position to re-set the keys and sleeves.

34. In a voting machine, the combination of the keys, with the sleeves rotatably mounted thereon and having limited movement, connections between said keys and sleeves whereby the operation of the key moves the sleeve and the re-setting of the sleeve re-sets the key, the bars $G^4$ compelling the movement of said sleeves in unison, the cross-bar $J^4$, and connections between the bars $G^4$ and the cross bar $J^4$ whereby the movement of the cross-bar $J^4$ will cause the movement of the bars $G^4$ to reset all the keys.

35. In a voting machine the combination of a series of ballot selecting mechanisms, such as keys freely movable into and out of operative position, devoted to candidates for some particular office, and means for holding the keys yieldingly in either position, with a corresponding series of ballot indicating devices, such as registers, a corresponding series of electro-magnets for operating said ballot indicating devices, means for preventing the simultaneous operation of more than a single ballot selecting mechanism by the same voter, and a source of electricity for said electro-magnets controlled by said ballot selecting mechanism.

36. In a voting machine the combination of a series of ballot selecting mechanisms, such as keys freely movable into and out of operative position, devoted to candidates for the same office, a corresponding series of ballot indicating devices, such as registers, a corresponding series of electro-magnets for operating said ballot indicating devices, means for preventing the simultaneous operation of more than a single one of said selecting mechanisms by the same voter; with a conductor for electricity available to all of said keys, separate switches for each of said keys, and a switch common to all of said keys, whereby when the common switch is closed, all the ballot indicating devices whose individual switches had been closed will be operated, substantially as described.

37. In a voting machine the combination of a series of ballot selecting mechanisms, such as keys, devoted to candidates for the same office, a corresponding series of ballot indicating devices, such as registers, a corresponding series of electro-magnets for operating said ballot indicating devices, means for preventing the operation of more than a single one of said ballot selecting mechanisms by the same voter; with a conductor of electricity available to all of said keys, separate switches for each key between them and the main line of the conductor, a switch in said main line common to all the keys; and a door giving access to the ballot selecting mechanism, the operation of which closes the common switch so as to operate the ballot indicating devices whose individual switches have been closed, substantially as described.

38. In a voting machine, the combination with the individual candidate registers, electro-magnets for operating the same, and keys for controlling the electro-magnets, of a conductor consisting of a trunk line from the source of electricity, branch lines, one for each party group, contacts from the branch lines for each switch in that party group, and a corresponding trunk line, branch lines, and contacts for the return current, substantially as described.

39. In a voting machine, the combination with the individual candidate registers, electro-magnets for operating the same, and keys for controlling the electro-magnets, of a conductor consisting of a trunk line from the source of electricity, branch lines, two for each party group, contacts from the branch lines for each switch in that party group, a corresponding trunk line, branch line, and contacts for the return current, and a compound switch for each key, substantially as and for the purpose described.

40. In a voting machine, the combination with the individual candidate registers, keys, and electro-magnets; of a conductor consisting of a trunk line from the source of electricity, branch lines, two for each party group, contacts from the branch line for each switch in that party group, a corresponding trunk line, branch lines, and contacts for the return current, compound switch controlled by the position of the keys located between said contacts; and a switch for cutting out all of the second branch lines except one, and connections between said switches for preventing the reception of the current by more candidate registers than there are offices to be filled.

41. In a voting machine, the combination with the keys, of the plurality of switches controlled thereby, arranged in rows, and the contact supporting members consisting of bars, one for each row, having the teeth projecting between said switches.

42. In a voting machine, the combination with a plurality of registers, of means for operating the same actuated by electricity, selective mechanism such as keys movable into and out of operative position and remaining in the position to which they are moved, circuits connected with said operating means, and mechanism for closing the circuits and operating the registers for which the selective mechanism has been set.

43. In a voting machine, the combination with a plurality of registers, of means for operating the same actuated by electricity, selective mechanism such as keys movable into and out of operative position and remaining in the position to which they are moved, circuits connected with said operating means, mechanism for closing the circuits and actuating the registers for which the selective mechanism is set, and re-setting mechanism for returning the selective mechanism to inoperative position.

44. In a voting machine, the combination with a plurality of keys freely movable into operative or inoperative position and means for holding the keys yieldingly in either position, of a corresponding plurality of registers, switches for said registers controlled by the position of said keys, electro-magnets for actuating said registers, and means for supplying an electric current to such electro-magnets as have their switches closed; substantially as described.

45. In a voting machine, the combination with a plurality of keys freely movable into and out of operative or inoperative position and means for holding the keys yieldingly in either position, of a corresponding plurality of registers, switches for said registers controlled by the position of said keys, interlocking mechanism for controlling the number of switches that may be operated simultaneously, electro-magnets for actuating said registers, and means for supplying current to such electro-magnets as have their switches closed; substantially as described.

46. In a voting machine, the combination of a series of keys, with a movable step by step multi-candidate device actuated one step for each key operated, whether said keys are actuated *seriatim* or simultaneously.

47. In a voting machine, the combination of plural series of ballot indicating devices, grouped according to offices and parties, with a movable step by step multi-candidate controlling device limiting the number of ballot indicating devices that may be operated, and means for operating said devices *seriatim*, or simultaneously as to parties.

48. In a voting machine, the combination with a series of keys and a corresponding series of registers, of a motor for each register and a controlling member for each motor controlled by its key, interlocking devices to control the operation of said member and a source of power for actuating said motors controlled by said members, substantially as described.

49. In a voting machine, the combination with a series of keys and a corresponding series of registers, of a motor for each register and a controlling member for each motor controlled by its key, interlocking devices applied to said keys to control the operation of said members and a source of power for actuating said motors controlled by said members.

50. In a voting machine, the combination of a series of candidate registers, selecting apparatus for said registers, with motors for actuating said registers, and a source of power for said motors, and a compound controlling member for each motor controlling the supply of power thereto, one member of said controlling member being connected to and controlled by the position of the selecting apparatus, and the other member of all the controlling members being connected and moved in unison by any actuation of the selecting apparatus.

51. In a voting machine, the combination of a series of candidate registers and a corresponding series of keys, with motors for actuating said registers and a source of power for said motors, and a compound controlling member for each motor controlling the supply of power thereto, one member of said controlling member being connected to and controlled by the position of its key, and the other member of all the controlling members being connected and moved in unison by the actuation of any key.

52. In a voting machine, the combination of a series of candidate registers and co-operating keys, with actuating mechanism for said registers and means for moving said actuating mechanism, and a compound controlling member for each actuating mechanism controlling its operation, one member of said controlling member being connected to and controlled by the position of the associated key, and the other members all being connected and moved in unison by the actuation of any key.

53. In a voting machine, the combination with plural series of registers and motors therefor, with a source of power for actuating said motors, and corresponding series of controlling members, the position of which at a subsequent operation controls the operation of said motors, substantially as described.

54. In a voting machine, the combination with a series of registers and motors actuating the same, of a source of power for said motors, and controlling mechanism for said motors to prevent the operation of any of them when more than a predetermined number is indicated for operation.

55. In a voting machine, the combination of a series of keys devoted to candidates for the same office, with power controlling members, such as the sleeves $E^4$, connected so that the movement of one key will move all of said members.

56. In a voting machine, the combination of a series of keys devoted to candidates for the same office, with the power controlling members such as the sleeves $E^4$ connected so that the movement of one key will move all of said members, and resetting mechanism connected with said power controlling members so that the operation thereof will re-set any of said keys.

57. In a voting machine, the combination of the key shafts O having the projections X' thereon, with the interlocking blocks $A^2$ having the pivoted dog V' therein.

58. In a voting machine, the combination of the key shafts O having the projections X' thereon, with the interlocking blocks $A^2$ having the pivoted dog V' therein, and the stationary projection $E^2$, substantially as and for the purpose described.

59. In a voting machine, the combination with a series of registers in a multi-candidate group, motors for actuating the same, selecting mechanism operated by the voter, and a source of power for operating said motors, of multi-candidate mechanism actuated by the operation of the selecting mechanism, and a cut-off device controlled by said multi-candidate mechanism to cut off power when the selecting mechanism has been overoperated.

60. In a voting machine, the combination with a series of registers in a multi-candidate group, motors for actuating the same, selecting mechanism operated by the voter, and a source of power for operating said motors, of multi-candidate mechanism actuated by the operation of the selecting mechanism, and a cut-off device controlled by said multi-candidate mechanism to cut off the power from the motors when the selecting mechanism has been overoperated.

61. In a voting machine, the combination with a series of registers comprising among others a multi-candidate group of registers, motors for actuating the same, selecting mechanism operated by the voter, and a source of power for operating the same, of multi-candidate mechanism actuated by the selecting mechanism for the multi-candidate group, and a cut-off device controlled by said multi-candidate mechanism to cut off the power from the multi-candidate motors while permitting it to pass to the motors of the remaining registers.

62. In a voting machine, the combination with a series of registers comprising among others a multi-candidate group of registers, motors for actuating the same, selecting mechanism operated by the voter, a source of power for operating the same, and two conduits for said power, one conduit being connected to the multi-candidate motors and the other having no connection therewith, of multi-candidate mechanism actuated by the selecting mechanism for the multi-candidate group, and a cut-off device controlled by said multi-candidate mechanism comprising a valve or switch transfer the power from the conduit connected with the multi-candidate motors to the one not connected therewith.

63. An apparatus of the character described comprising a plurality of counters, a battery, a corresponding number of manually movable devices, such as keys, a circuit containing said counters, battery and keys, normally broken connections at two points between each of said devices and its counter, each of said devices being arranged to close its individual connection, and means whereby all of said connections may be simultaneously closed at the second broken connection while said individual connections are also closed.

64. An apparatus of the character described, comprising a plurality of counters, a corresponding number of independent electric circuits, manually operated circuit closers for each circuit, means for holding said circuit closers in their closed positions, and a single switch normally open and adapted to simultaneously close all of such circuits as are closed by said former circuit closers.

JOHN HOWARD McELROY.

Witnesses:
R. W. ALLEN,
HATTIE O. HALVORSON.